United States Patent [19]

Nakamura et al.

[11] Patent Number: 4,719,440
[45] Date of Patent: Jan. 12, 1988

[54] ELECTRICAL COIL AND TERMINAL WITH CLIP

[75] Inventors: Mamoru Nakamura, Takahama; Hideo Haneda, Toyota, both of Japan

[73] Assignee: Aisin Seiki Kabushiki Kaisha, Japan

[21] Appl. No.: 772,804

[22] Filed: Sep. 5, 1985

[30] Foreign Application Priority Data

Sep. 6, 1984 [JP] Japan ................. 59-135525

[51] Int. Cl.⁴ ........................................... H01F 15/10
[52] U.S. Cl. ............................... 336/192; 174/94 R
[58] Field of Search .............. 174/94 R; 339/276 R, 339/276 E, 276 S; 336/192; 310/71

[56] References Cited

U.S. PATENT DOCUMENTS

| | | | |
|---|---|---|---|
| 1,431,158 | 10/1922 | Heany | 339/276 |
| 3,349,167 | 10/1967 | Mixon, Jr. et al. | 174/94 R |
| 3,663,914 | 5/1972 | Lane | 336/192 |
| 3,678,176 | 7/1972 | Reimer | 174/94 R |
| 3,777,051 | 12/1973 | Ziegler, Jr. et al. | 174/94 R |
| 3,848,208 | 11/1974 | Dawson et al. | 336/192 X |
| 3,916,139 | 10/1975 | Schantz | 336/192 X |
| 4,034,152 | 7/1977 | Warner | 174/94 R |
| 4,086,553 | 4/1978 | Robandt et al. | 336/192 |

FOREIGN PATENT DOCUMENTS

| | | | |
|---|---|---|---|
| 622561 | 12/1935 | Fed. Rep. of Germany | 174/94 R |
| 58-11094 | 7/1983 | Japan | |
| 798924 | 7/1958 | United Kingdom | 174/94 R |

*Primary Examiner*—Thomas J. Kozma
*Attorney, Agent, or Firm*—Sughrue, Mion, Zinn, Macpeak and Seas

[57] ABSTRACT

An electrical coil including a pair of terminal members each having a generally U-shaped clip portion for connecting a terminal end wire of a winding of coil to an appropriate one of the terminal members. The clip portion has a curvature of at least 0.5 mm radius formed on its end wire receiving surfaces located on the side thereof which is closer to the winding of coil along the end wire extending from the winding.

1 Claim, 9 Drawing Figures

ELECTRICAL COIL AND TERMINAL WITH CLIP

FIELD OF THE INVENTION

The present invention relates to an electrical coil which is usable in electrical parts or devices such as electrical motor, solenoid, etc. More particularly, it relates to a structure in the electrical coil for securing the terminal end wires of the winding of coil for connection thereof to the terminal members such as terminal or connector of the coil.

BACKGROUND OF THE INVENTION

A technique for connecting terminal end wires of an electrical coil to their appropriate terminal members is disclosed by Japanese Patent Publication No. 58 (1983)-11094. In the electrical coil according to this prior art, each of the terminal members thereof is provided with a lug portion formed by punching out and then bending, thereby defining an end wire receiving U-shaped clip portion in the terminal member, or alternatively the terminal member itself is formed substantially into a U-shape, and the end wire extending from the coil, which is clad with insulation material such as polyester, is connected to the terminal member of the coil by holding the wire in the wire receiving slot of the U-shape and subsequently crimping the straight portions of the U-shape over the wire by a pair of movable electrodes of resistance welder while simultaneously applying voltage across the electrodes. In so doing, the insulation coating on the terminal end wire is removed by welding pressure and heat and the bare wire is secured by fusion, or fusion welded, to the terminal member of the electrical coil.

However, the electrical coil having its end wires thus welded to the terminal members often encounters a problem in that the wire tends to break easily at its connection with the terminal member and hence separated therefrom in the event when even a small external force is applied to the wire.

SUMMARY OF THE INVENTION

Accordingly, it is an object of the present invention to provide an electrical coil which is designed and constructed specifically to minimize the danger of break of coil's end wires at the connection with their terminal members.

It is known that the aforementioned break of the wire often occurs at the edge of the U-shape located on the side which is closer to the winding of coil along the wire extending from the coil. It can be considered that when the electrodes of resistance welder crimp the U-shaped clip portion of the terminal member, the edge of the clip portion provides pressure acting as shearing force to the wire and that the application of such shearing force causes a break in coil's terminal end wire.

In view of such cause of the break, the electrical coil according to the present invention includes an end wire receiving U-shaped portion in the form of a clip in the terminal member thereof and such clip has a curvature having at least 0.5 mm radius formed on the end wire receiving surfaces thereof.

By so arranging the electrical coil, the clip portion of the terminal member at which the terminal end of wire extending out from the coil is secured for connection thereto can be shaped with a moderate, smooth configuration. This helps avoid the concentration of the shearing force created during deforming the clip portion of the terminal member by a pair of movable electrodes of resistance welder, and the end wire connected to the terminal member, when subjected to bending, can be bent along the curvature of a relatively large radius, so that the damaging force to bend the wire can be advantageously lessened. Additionally the tensile strength of the wire obtainable at its connection with the terminal member, as well as the wire strength against bending, e.g. at about 90°, can be improved remarkably, with the result that the fear of the aforementioned break can be greatly reduced.

According to a preferred embodiment of electrical coil according to the present invention, one end of the U-shaped clip portion, located on the side which is closer to the winding of coil along the wire extending from said coil, has surfaces in chamfered configuration as seen in section, each including a first curvature of at least 0.5 mm radius, a straight portion extending at an angle of taper of less than 90° with respect to the axis of the wire end secured by the clip, and a second curvature of at least 0.5 mm radius which are formed in this order from said end toward the inner surfaces of the U-shape of said clip portion and joined in continuation with one another so as to provide smoothly curved surfaces. In a modified embodiment of the invention, the clip portion of the terminal member has such inclination that the extent of deformation of the end wire is greater on the side of the clip portion which is remote from the coil than on the opposite side thereof.

In either of the embodiments, the portion of the end wire at which it is secured to the terminal member is deformed moderately enough to prevent the concentration of the shearing force, and the tensile strength of the wire at the connection with the terminal member and also the strength against bending can be improved, with the result that the danger of a break in the wire can be reduced greatly.

The above and other objects, features and advantages of the present invention will become more readily apparent from the following detailed description of its preferred embodiments, when taken in conjunction with the accompanying drawings.

BRIEF DESCRIPTION OF THE DRAWINGS

FIG. 1b is a side view of a U-shaped clip portion of the terminal member as seen from the arrow 1B of FIG. 1a;

FIG. 2 is a longitudinal sectional view of a solenoid valve incorporating therein the electrical coil of the invention having the terminal members shown in FIG. 1a;

DETAILED DESCRIPTION OF PREFERRED EMBODIMENT

Figure 3:
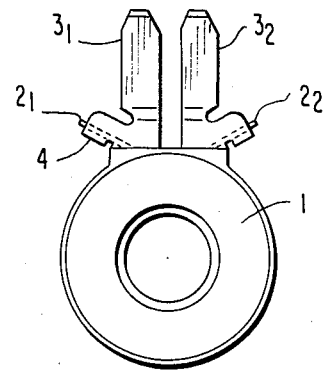
FIG. 3 is a side view of the solenoid valve as seen from the arrow III of FIG. 2.
Figure 2:
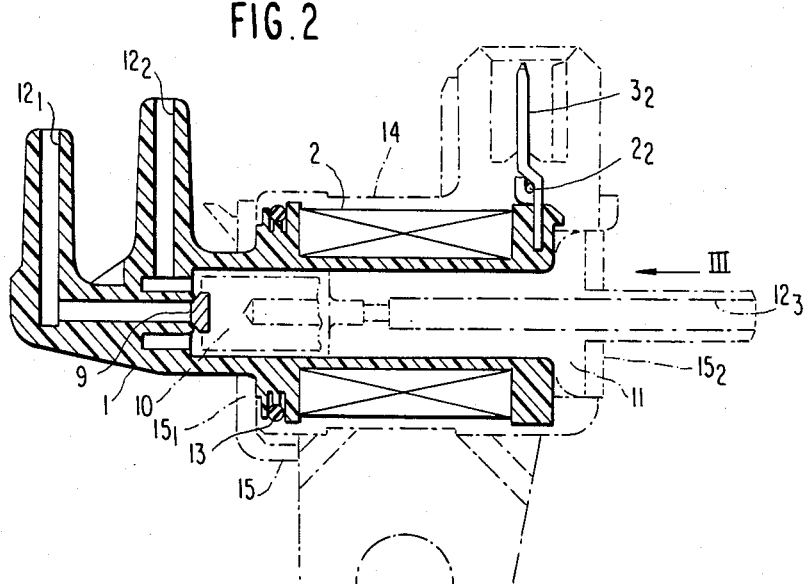

Referring to FIGS. 2 and 3 showing a solenoid valve, there is provided a bobbin 1 around which is formed a winding of wire defining a coil 2. As shown in FIG. 3, the coil 2 has a terminal end wire $2_1$ secured by welding to a clip portion 4 of first terminal member $3_1$ and another end wire $2_2$ welded to a similar clip portion of second terminal member $3_2$, for connection to the respective appropriate terminal members. The two terminal members $3_1$ and $3_2$ in the illustrated embodiment are disposed in a symmetrical arrangement, as shown in FIG. 3.

Figure 1A:
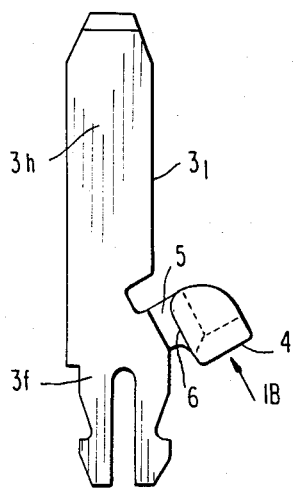
FIG. 1a is a plan view shown in an enlarged scale illustrating a preferred embodiment of a terminal member for the electrical coil according to the present invention.

Referring then to FIG. 1a, the terminal member $3_1$ includes an end portion $3h$ for connection to external lead and forked leg portion $3f$ which is studded in the coil bobbin 1 as shown in FIG. 2. The terminal member $3_1$ further includes an integral clip portion 4 which is branched from a portion of the terminal member between the leg portion $3f$ and the external connecting end portion $3h$.

Figure 1B:
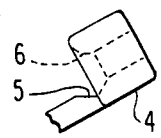

The clip portion 4, as seen in a direction perpendicular to the arrow 1B, has a U-shape which is opened toward the external connecting end portion $3h$. It is noted, therefore, the arrow 1B in FIG. 1a is directed toward the bottom portion of the U-shape, which is shown in FIG. 1b.

Between the clip portion 4 and the leg portion $3f$ is formed a groove 5 recessed with a curvature of 0.5 mm radius and having surfaces extending outwardly therefrom at an angle of about 30°. The terminal end wire receiving surfaces 6 of the clip portion 4 located on the side of the groove 5 are formed with a curvature of 0.5 mm radius, a straight portion with 30° angle of taper joining continuously with the curvature, and another curvature of 0.5 mm radius joining in turn continuously with said straight portion. The first-said curvature of 0.5 mm radius adjacent to the groove 5 is joined continuously with one outwardly extending surface of the groove. The above described profile of the surfaces 6 of the clip portion 4 is illustrated in section more clearly in FIG. 1c.

Figure 1C:
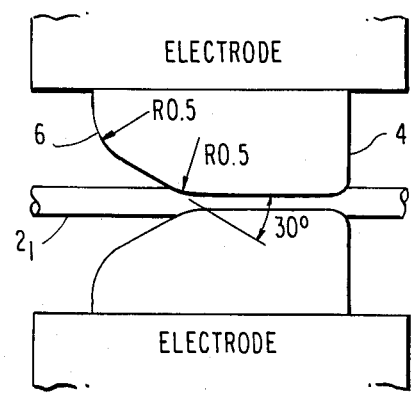
FIG. 1c is a sectional view showing how a terminal end wire of the coil is welded for connection to the clip portion of the terminal member.

As shown in FIG. 1c, one terminal end wire 21 of the electrical coil 2 is pressed down by the clip 4 and secured to its terminal member 31 for connection thereto. This is accomplished by crimping the the clip portion 4 over the wire $2_1$ by a pair of electrodes of resistance welder. This manner of connection is true of the end wire $2_2$ fixed to the clip 4 of the other terminal member $3_2$ which is arranged symmetrically with said one terminal member $3_1$.

Reference is made again to FIG. 2. The coil bobbin 1 has a central space formed in communication with fluid ports $12_1$ and $12_2$, respectively. In the space are received a magnetic plunger 10 having a valve member 9 at its leftward end (as seen in FIG. 2), a magnetic core 11 supporting the plunger 10 and having a central fluid passage formed therein, and a coil spring (not shown) for biasing the plunger 10 toward the left. The central fluid passage in the core 11 is provided for communication with a fluid port $12_3$.

The bobbin 1 is encapsulated by a cover 14 and a magnetic yoke 15 having ends $15_1$ and $15_2$ is attached over the bobbin 1, cover 14 and core 11. By pressing the ends $15_1$ and $15_2$ of the yoke 15 toward each other, the bobbin 1 is made integral with the cover 14 and also with the core 11 by the yoke 15. An O-ring 13 is installed between the bobbin 1 and the cover 14.

In de-energized state of the solenoid, or when no current is flowing in the coil 2, the spring-loaded plunger 10 is placed in its leftmost position, as shown in FIG. 2, under the influence of the coil spring (not shown). Therefore, the ports $12_2$ and $12_3$ communicate each other, while the port $12_1$ is then closed by the valve member 9 and the communication thereof with the ports $12_2$ and $12_3$ is shut off. When the coil 2 is excited, on the other hand, the plunger 10 is pulled to its rightmost position and the ports $12_1$ and $12_2$ are placed in communication with each other, while the port $12_3$ is substantially closed by the plunger 10 to shut off the communication thereof with the ports $12_1$ and $12_2$.

The manner of connecting the terminal end wires $2_1$ and $2_2$ to their corresponding terminal members $3_1$ and $3_2$ of the coil 2 will be described again in the following.

The clip portions 4 of the terminal members $3_1$ and $3_2$ are U-shaped with its straight parallel portions wide open before the end wires are fastened for connection to the clips. For connection to the clips 4, the end wires $2_1$ and $2_2$ are inserted through the openings of the clip portions 4 of their corresponding terminal members 4, and the straight parallel portions of the clip 4 then flanked by the electrodes of resistance welder are crimped or pressed toward each other by the electrodes while simultaneously applying voltage thereacross. By so doing, the end wires $2_1$ and $2_2$ are deformed as shown, e.g. in FIG. 1c, and fusion welded to the clip portions of the terminal members $3_1$ and $3_2$, respectively. As is understood by those skilled in the art, the connection of the wires can be accomplished by fusion due to the welding heat and pressure.

Figure 4:
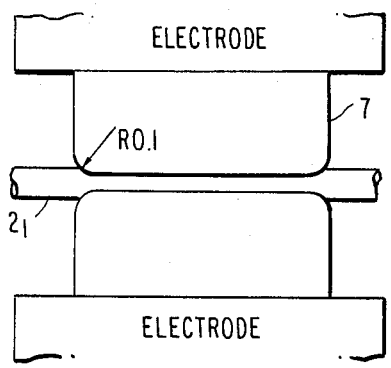
FIG. 4 is a sectional view similar to FIG. 1c, but showing an example of prior art wherein the end wire of coil is welded for connection to a clip portion having a relatively small radius of curvature.
Figure 5A:
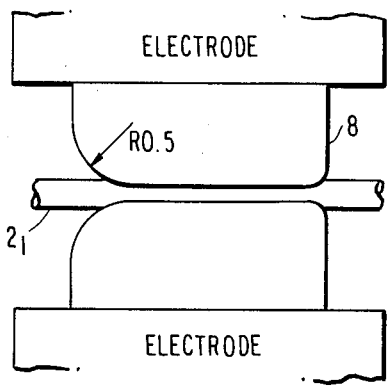
FIG. 5a is a sectional view similar to FIG. 1c, but showing another embodiment of the invention wherein the the clip portion is formed with a radius of curvature greater than that of FIG. 4.

FIG. 4 exemplifies connection of the end wire $2_1$ secured by resistance welding to a clip 7 of conventional structure having a curvature of only 0.1 mm radius; FIG. 5a shows the connection to a clip 8 having a curvature of 0.5 mm radius; and FIG. 1c shows the connection of the end wire $2_1$ to the clamp 4 as described in detail in connection with the aforementioned preferred embodiment (FIG. 1a and FIG. 2) of the invention. The results from the experiment carried out by the inventors for comparison of these connections are shown in FIG. 1d.

Figure 1D:
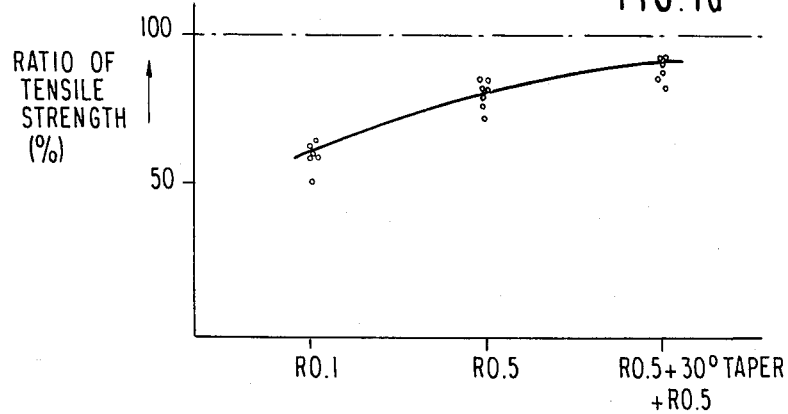
FIG. 1d is a diagram showing the relationship between the radius (R) of curvature formed on the clip portion and the tensile strength of the wire.

In the graph of FIG. 1d, the ordinate represents the ratio of tensile strength, expressed in percentage, of the end wire at each of the welded connections to the original strength of the wire before winding into a coil. In the abscissa, "R0.1''''", "R0.5''''" and "R0.5+30° taper+R0.5''''" correspond to the connections of wires to the clips 7, 8 and 4 shown in FIGS. 4, 5a and 1c, respectively, and the tensile strength is plotted for each of such connections.

It can be understood from FIG. 1d that provision of a curvature of 0.5 m radius on the clip portion of terminal member can makes possible achievement of more than 80% tensile strength and that the embodiment FIG. 1c of the invention can further improve the strength to more than 90%. Because the curvature with a large radius can accommodate to bending of the end wire, it can greatly improve its durability against application of repeated bending and vibration.

Figure 5B:
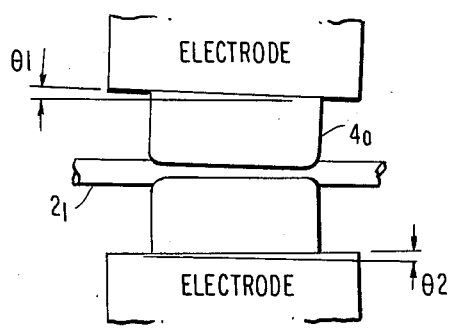
FIG. 5b is a sectional view showing still another embodiment of the invention wherein the end wire of the coil is secured to the clip portion by welding electrodes set at an angle of taper.

Now referring to FIG. 5b which illustrates another embodiment according to the present invention, the electrodes of resistance welder are set such that the surfaces thereof in pressing contact with the clip portion 4a are inclined at angles $\theta_1$ and $\theta_2$ ($\theta_1=\theta_2=5-15°$) directed in opposite directions with respect to the axis of the wire so that the end wire $2_1$ when pressed down by the electrodes by way of the clip 4a may be deformed substantially into a wedge shape. To put in other words, the wire $2_1$ is secured to the clip 4a of the terminal member in such a way that the amount of dent formed by the pressure exerted by the electrodes is greater on the side of the clip portion 4a which is remote from said winding coil along the wire extending therefrom than on the opposite side of said clip portion, thereby to shape the wire into a taper when welded to the clip portion 4a. The connection of end wire to the clip of terminal member according to this embodiment can offer the same advantages and effects as those accomplished by the aforementioned preferred embodiment in that the coil wire is pressed down by the clip portion into a taper. Additionally, the clip 4a may be provided on the side thereof toward the coil with a curvature of at least 0.5 mm radius. The connection of wire to the terminal member according to this embodiment of FIG. 5b can offer the same advantages and effects as those which are achieved by the aforementioned preferred embodiment in that the end wire is pressed and deformed into a taper and, therefore, the inner surfaces of the clip 4a are substantially tapered with respect to the axis of the wire 2.

As it is now apparent from the foregoing, the electrical coil according to the present invention can accomplish great improvement of tensile strength at the connection between the end wire and the terminal members. In addition, because the wire, even if it is bent by any external force, can accommodate itself to the curvature with a large radius, its resistance against repeated bending or vibration can be improved greatly. Accordingly, the fear of breaking of the coil end wires at the connections with the terminal members can be reduced to a minimum.

While the invention has been illustrated and described with reference to specific embodiments, it is to be understood that various modifications in the details of the method or the apparatus may be made without departing from the spirit and scope of the invention.

What is claimed is:

1. An electrical coil comprising:
a bobbin (1), a winding of coil (2) formed on said bobbin and having terminal end wires ($2_1$, $2_2$);
a pair of terminal members ($3_1$, $3_2$) having means to secure said members to the bobbin;
means for connecting said terminal end wires to said terminal members, each of said terminal end wires being joined by resistance welding to said connecting means, said connecting means includes a U-shaped clip portion which is integrally formed with each of said terminal members; and
each clip portion has an end wire receiving surface with a first receiving end and a second receiving end, said receiving ends having convex surfaces in contact with said wire end, and said first receiving end comprises a first curvature of at least 0.5 mm radius contiguous with an angled portion extending in a direction away from said second receiving end and inclined at an angle of less than 90° with respect to the axis of said wire end and which in turn is contiguous with a second curvature of at least 0.5 mm radius whereby the residual stress is reduced between the wire end and clip.

* * * * *